United States Patent [19]

Hsiao

[11] Patent Number: 5,375,869
[45] Date of Patent: Dec. 27, 1994

[54] STRUCTURE FOR A VERSATILE BABY STROLLER

[76] Inventor: Patty Hsiao, 4F, No. 7, Alley 9, Lane 250, Sec. 2, Cheng Kung Rd., Nei-Hu, Taipei, Taiwan, Prov. of China

[21] Appl. No.: 98,922

[22] Filed: Jul. 29, 1993

[51] Int. Cl.⁵ .............................................. B62B 7/12
[52] U.S. Cl. ..................................... 280/648; 280/31; 280/643; 280/47.38
[58] Field of Search ............... 280/648, 647, 642, 643, 280/658, 47.38, 30, 31; 297/118

[56] References Cited

U.S. PATENT DOCUMENTS

| | | | |
|---|---|---|---|
| 2,541,263 | 2/1951 | Mayo et al. | 280/648 X |
| 2,754,889 | 7/1956 | Lovelace | 280/648 X |
| 2,872,203 | 2/1959 | Hedstrom | 280/643 |
| 2,982,562 | 5/1961 | Gladstein | 280/648 |
| 3,330,575 | 7/1967 | Boudreau | 280/648 |
| 4,741,056 | 5/1988 | Kassai | 280/648 X |
| 4,786,064 | 11/1988 | Baghdasarian | 280/648 X |
| 5,230,523 | 7/1993 | Wilhelm | 280/648 X |
| 5,234,224 | 8/1993 | Kim | 280/648 X |

FOREIGN PATENT DOCUMENTS 622622 5/1949 United Kingdom ................. 280/648

Primary Examiner—Eric D. Culbreth
Assistant Examiner—Carla Mattix
Attorney, Agent, or Firm—Lowe, Price, LeBlanc & Becker

[57] ABSTRACT

A versatile baby stroller according to the present invention provides the function of a baby crib, a stroller, a high chair for feeding and a bath pan can be placed on it for the convenience of bathing a baby. The height and the width of the assembly can be easily adjusted for different functions. Moreover, the resting portion and the wheel-frame portion can be detached and the resting portion can be clamped onto a table for convenience. The main structure of the versatile baby stroller comprises a resting portion and a wheel-frame portion. The resting portion comprises a frame body, a push handle, a supporting rod and a foot rest. The wheel-frame portion comprises a H-shaped frame and two legs with rollers and the wheel-frame assembly is located underneath the frame body of the resting portion. The push handle and the supporting rods are made to be inserted into the connecting ends of the frame body, they can be detached and extended laterally, forming with the frame body an activity center for the baby. The food tray is easy to set up and can be rotated around the frame body for storage. The H-shaped frame is inserted into the lower part of the frame body and its height is adjustable.

2 Claims, 5 Drawing Sheets

STRUCTURE FOR A VERSATILE BABY STROLLER

BACKGROUND OF THE INVENTION

1. Field of the Invention

The present invention relates to a new structure for a versatile baby stroller. More specifically, the present invention relates to a baby stroller which serves to be used as a stroller, a high chair, a baby crib as well as a bath tub for an infant.

2. Description of the Prior Art

The majority of baby furniture and products available in the market today are designed to be used for a single purpose only. Parents spend a lot of money in a variety of items in order to take good care of their babies. These varieties of baby items create an unnecessary expense. For example, a stroller is needed to move the baby around outside the residence, a baby crib is needed inside the house, a high chair is needed for feeding and a tiny bath tub is needed for giving a bath to the baby. Too many of these baby items can possibly create some trouble which includes:

(1) The house looks messy when too many of the baby furniture are around and it is not easy to store them.

(2) In most cases, these baby furniture are mot handy to be carried around.

(3) Baby furniture that are designed with a single purpose are not practical. A stroller is not designed to be used as a high chair and a high chair is not easy to be moved around for the convenience of feeding. It is also uncomfortable for a parent to bent to give a bath to the baby.

SUMMARY OF THE INVENTION

The main object according to the present invention is to provide a versatile baby stroller which can be used at a combination of a stroller, a crib and a high chair. The height and width of the versatile stroller according to the present invention can be adjusted as needed. It can also be adjusted for the convenience of giving a bath to a baby.

Another object according to the present invention is to provide a versatile baby stroller such that it can be assembled and disassembled easily. This avoids the disadvantages of having too many pieces of baby furniture around the house.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
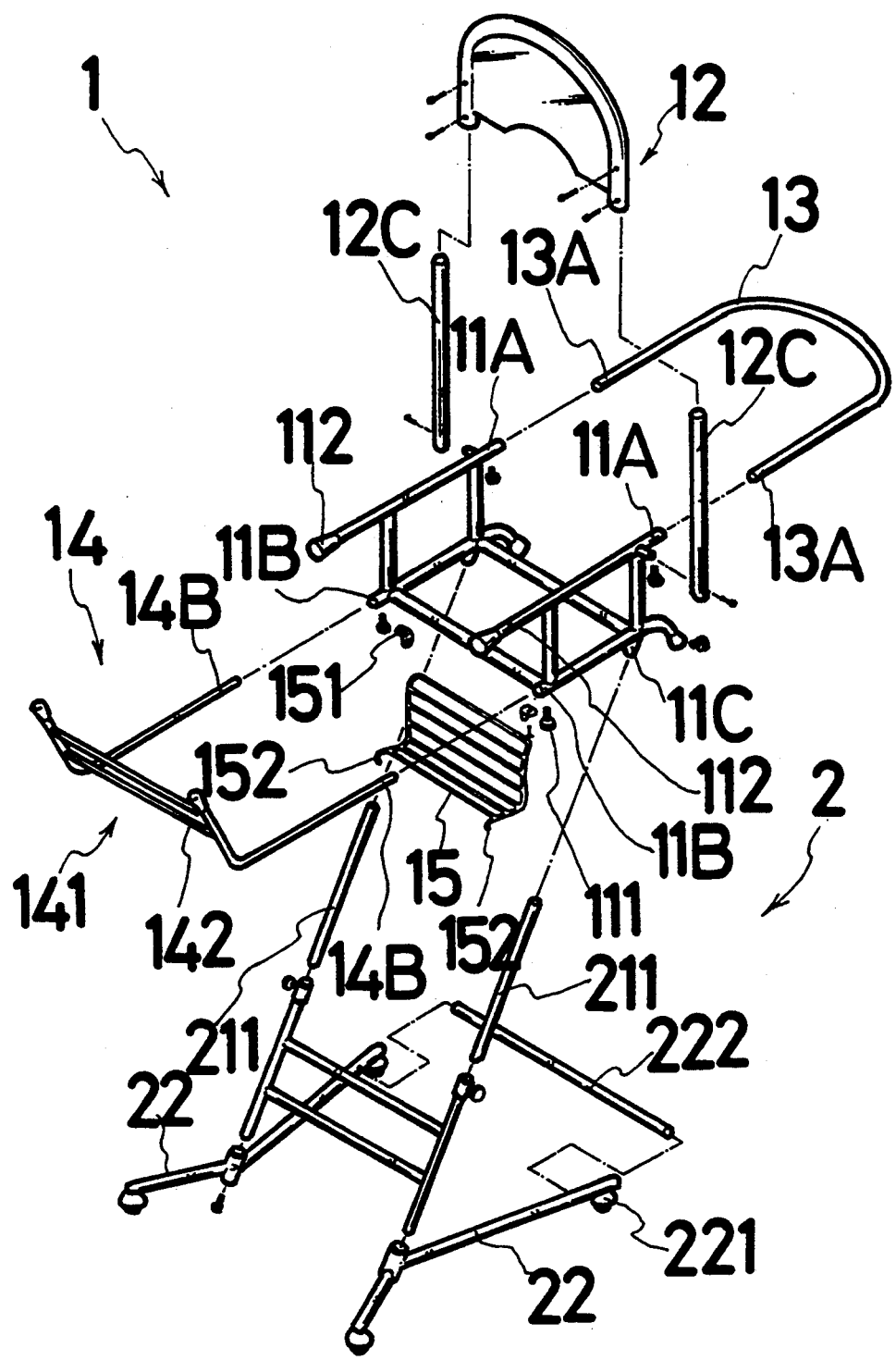
FIG. 1 is a perspective fragmented view of the versatile baby stroller according to the present invention.

Referring to FIG. 1, the versatile baby stroller according to the present invention consists of a resting portion 1 and a wheel-frame portion 2. The resting portion 1 consists of a frame body 11, a food tray 12 which is attached to the frame body 11, a push handle 13, a supporting rod 14 and a foot rest 15. The wheel-frame portion 2 mainly consists of a H-shaped frame 21 and two legs 22 within rollers. The frame body is a structure made up of several pieces of pipes, having 3 pairs of connecting ends 11A, 11B and 11C as well as a pair of projected rods 112. The push handle 13 and the supporting rod 14 are made out of bent pipes of rectangular shapes. The difference is that the push handle 13 is a flat body while the front portion 141 of the supporting rod 14 has two upward bends, which are connected to two connecting rods 142. In addition, the insertion legs 13A and 14B of the push handle 13 and the supporting rod 14 are made to fit into the connecting ends 11A and 11B of the frame body 11. This allows the push handle 13 and the supporting rod 14 to be locked together by the use of a bolt 111. The push handle 13 and the supporting rod 14 can also be disengaged and extended laterally, forming with the frame body 11 an activity space for the baby. The food tray 12 is also of a rectangular shape with two side legs 12C which are easy to put together and take apart. The ends of the two side legs 12C are secured to the two edges on the upper part of the frame body 11. Thus, the food tray 12 can be rotated around the frame body 11. When the food tray 12 is rotated to a horizontal position it will be supported by the projected rod 112 of the frame body 11. The foot rest 15 is a L-shaped body having two lugs 151 at one end through which the foot rest 15 is installed underneath the frame body 11. The other end of the foot rest 15 has reverse hooks 152. This provides a foot rest for the baby in a sitting position. When the foot rest 15 is pushed upward to another position, its reverse hooks 152 latches onto the connecting rods 142 for another function. The wheel-frame portion 2 is located underneath the resting portion 1. The H-shaped frame 21 extends upward through the extension slanted rods 211 which are inserted into the corresponding connecting ends 11C below the frame body 11. The lower part of the H-shaped frame 21 are fitted into the two legs 22 with the rollers. Each of the legs 22 has a wheel 221 and a bracing rod 222 is used to strengthen the two legs 22.

Figure 2:
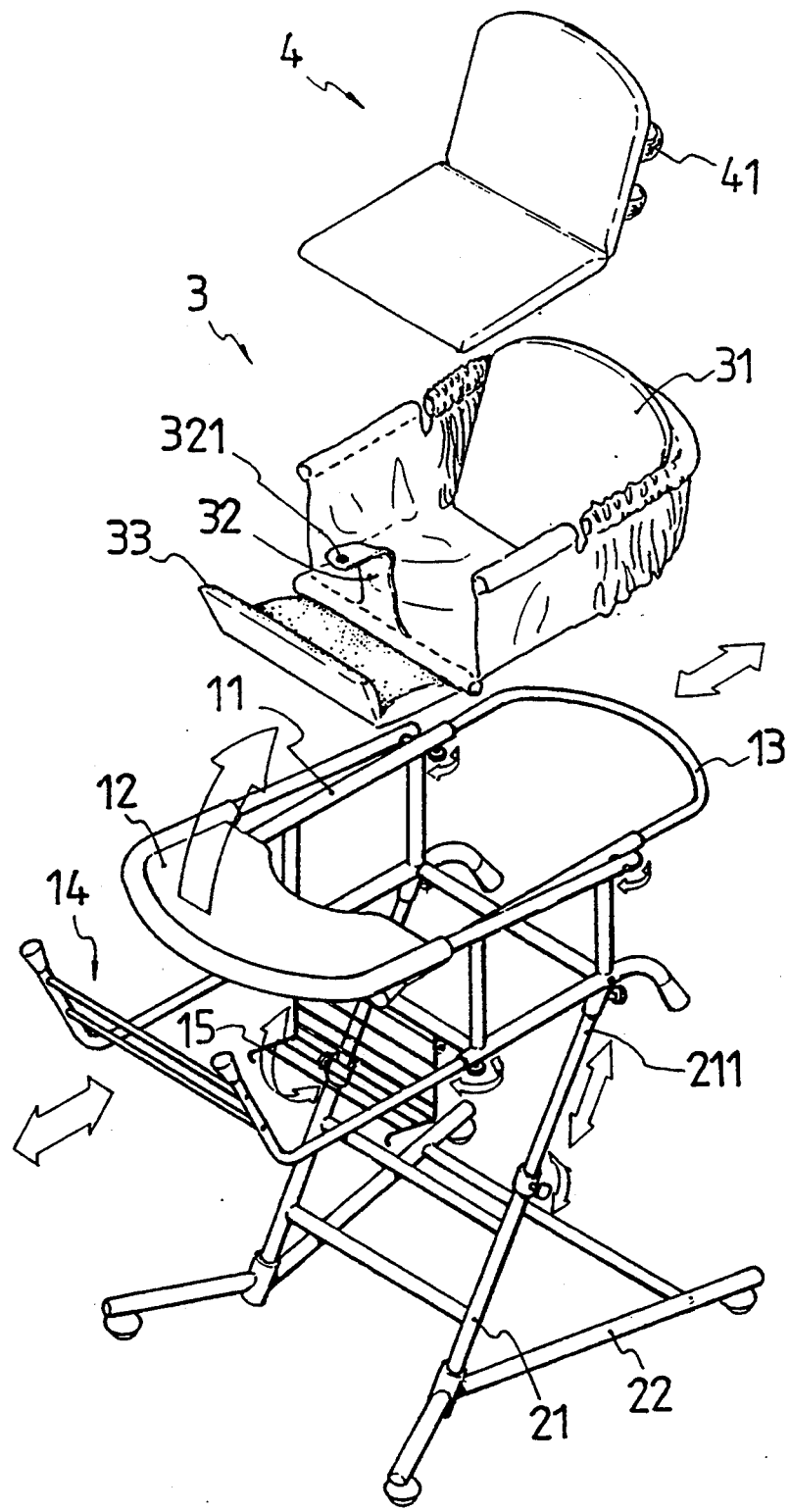
FIG. 2 is a perspective view showing the assembly of the versatile baby stroller according to the present invention FIG. 3 a front view of the versatile baby stroller according to the present invention.

Referring to FIG. 2, which shows the assembly of the versatile baby stroller according to the present invention. The arrows in the drawing indicated that portion of the assembly is adjustable or rotatable as needed. For instance, the push handle 13 and the supporting rod 14 can be adjusted laterally so as to form space of variable size with the frame body 11 for the baby to lay down or sit up. The food tray 12 can be set on top of the frame body 11 or rotated for storage. The wheel-frame portion can be adjusted by adjusting the H-shaped frame 21 with the slanted rods 211 and the foot rest 15 can be turned to an appropriate comfortable position. To complete the hard-frame versatile stroller for comfort, a bumper guard 3 of fabric material and a foldable soft pad 4 are installed which are designed to fit into the space formed by the frame body 11 and the push handle 13. On top of the bumper guard 3 is a foldable member 31, a blocking member 32 and a foot pad 33 which is attached to the foot rest 15. The foldable member 31 is attached firmly by an elastic band member 41 which is sewn on the back of the foldable soft pad 4, allowing the foldable member 31 to be stretched out and folded back as needed. The blocking member 32 provides a support for the two legs of the baby and is secured by a button 321 and the fastening device underneath the food tray 12. The foot pad 33 is installed on top of the foot rest 15 to provide a soft and comfortable padding for the foot.

Figure 3:
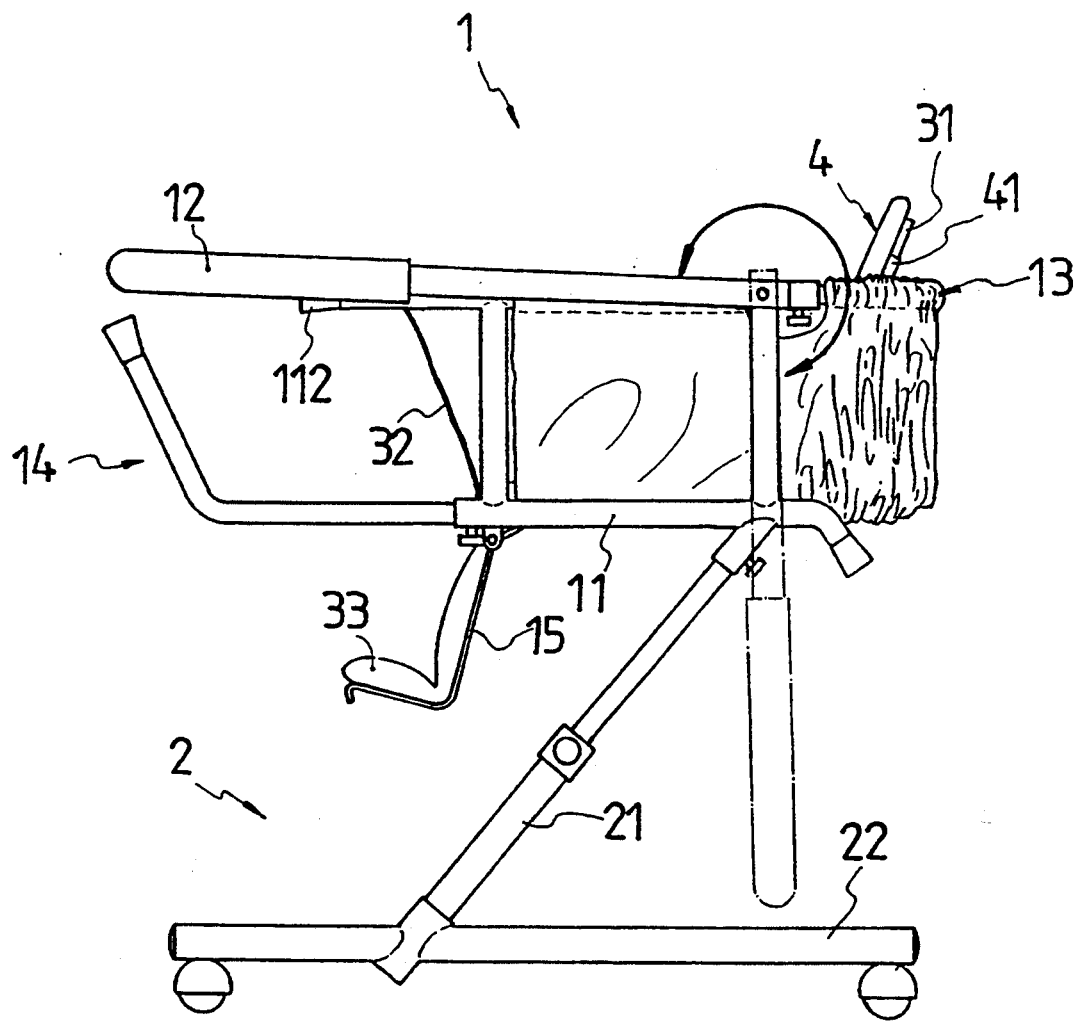
Figure 4:
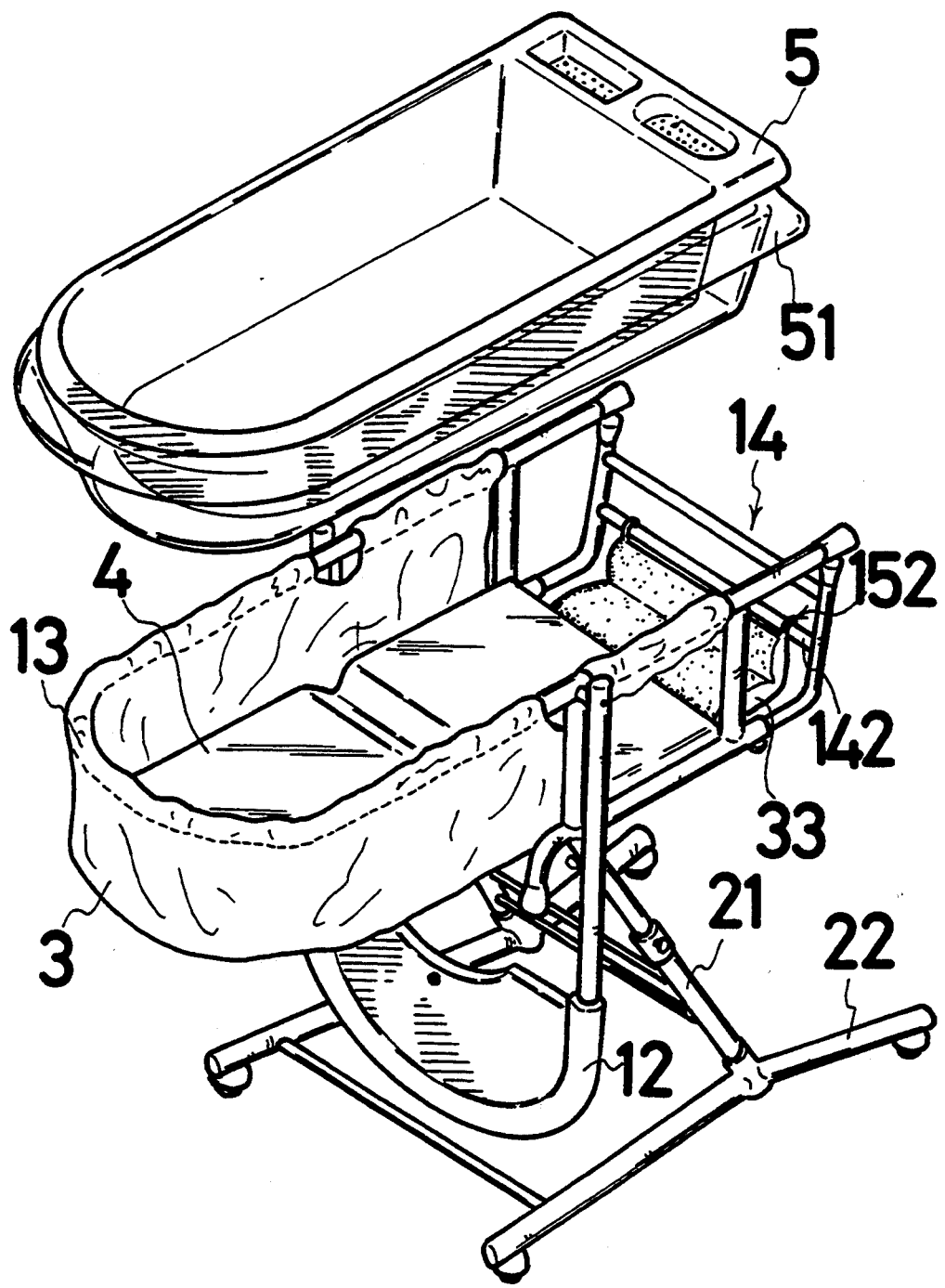
FIG. 4 is a perspective view of an embodiment of the versatile baby stroller according to the present invention.
Figure 5:
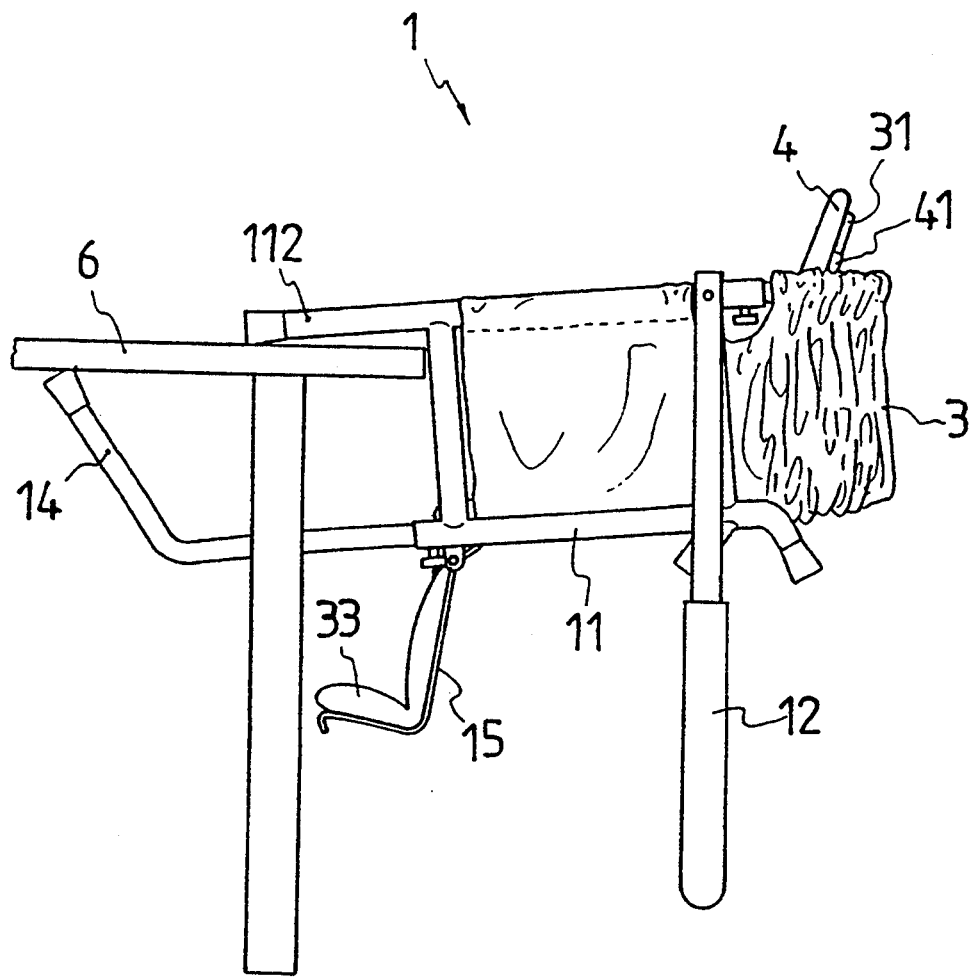
FIG. 5 is a front view showing another embodiment of the versatile baby stroller according to the present invention.

Referring to FIG. 3 for a front view of the versatile baby stroller according to the present invention. When the above components are put together and the baby is in a sit-up position, the push handle 13 can be adjusted as close to the frame body 11 as possible. The foldable soft pad 4 and the foldable member 31 can recline on the push handle 13 for the baby to lean on. In this position the baby can also have his meal with the food tray 12 in place. At this time the blocking member 32 and the foot pad 33 can serve their functions as designed. When finished with the meal, the food tray 12 can be turned backward and stored underneath the frame body 11. To convert the sit-up position into a baby crib, the push handle 13 is pulled away from the frame body 11 as much as possible and the foldable soft pad 4 is laid flat inside the frame body 11 for the baby to sleep on, as is shown in FIG. 4. At this time the supporting rod 14 at the other end must be adjusted to an appropriate position so that the foot rest 15 can be turned upward, allowing the reverse hooks to latch onto the connecting rods 142. The supporting rod 142, together with the frame body 11 and the push handle 13, form a baby crib of rectangular shape. Moreover, the size of this rectangular crib is able to hold a baby bath pan 5. In use, the bath pan 5 is used with a waterproof cover 51 to prevent the water getting into the frame body 11. Thus, the wheel-frame portion 2 according to the present invention can provide an adjustment for the resting portion 1 to have a suitable height. Parents can therefore choose a comfortable position to bath the baby. Referring to FIG. 5, which is another embodiment of the versatile baby stroller according to the present invention. The resting portion 1 can be set next to a dinning table 6. In this embodiment the projected rod 112 and the supporting rod 14 of the frame body 11 are used to clamp onto the edge of the dinning table 6, allowing the resting portion 1 to be securely mounted next to the dinning table 6. This embodiment of the versatile baby stroller serves as a high chair for feeding a meal to the baby.

What is claimed is:

1. A versatile baby stroller comprising: a resting portion and a wheel-frame portion, said resting portion comprising a frame body, a food tray attached to said frame body, a push handle, a supporting rod and a foot rest; said wheel-frame portion comprising an H-shaped frame and two legs having rollers mounted at each end of each of each of said legs, said legs mounted centrally on the lower end of said H-shaped frame;

said frame body being rectangular and including a plurality of interconnected pipe members having 3 pairs of connecting ends and a pair of projected rods;

said push handle and said supporting rod being substantially U-shaped and formed by bent pipe members, said push handle being a flat body and the front enclosed portion of said supporting rod having two upward bends at opposed legs thereof, the legs of said push handle and said supporting rod being received in opposite connecting ends of said frame body, so that said push handle and supporting rod can be locked to said frame body and can also be disengaged or extended laterally, forming with the frame body a space to receive a baby;

said food tray also being U-shaped with two side legs the ends of which are rotatably secured to the opposed sides on the upper part of the frame body, so that said food tray can be rotated around the frame body, and said food tray being adapted when rotated to a horizontal position to be supported by the projected rods on the frame body;

said foot rest being L-shaped and having two lugs at one end through which the foot rest is installed underneath the frame body, the opposite end of said foot rest having reverse hooks, to provide a foot rest for a baby in a sitting position;

said wheel-frame portion being located underneath said resting portion, ends of said H-shaped frame opposite said legs being inserted into connecting ends of said frame body, the lower part of the H-shaped frame mounting said legs and rollers including a bracing rod extending between said two legs.

2. The baby stroller of claim 1 further comprising a bumper guard of fabric material and a 2-section foldable pad installed in the space formed by the frame body and the push handle, a foldable member, a blocking member and a foot pad are provided on said bumper guard, said foldable member including an elastic band member sewn on the back of the foldable soft pad, whereby the foldable member may be stretched out and folded back as needed, the blocking member providing a support for a baby's legs is secured below the food tray, the foot pad being installed on top of the foot rest to provide a soft and comfortable padding for the foot.

* * * * *